(12) United States Patent
Theofanous et al.

(10) Patent No.: US 6,191,685 B1
(45) Date of Patent: Feb. 20, 2001

(54) BICYCLE THEFT PROTECTION SYSTEM

(76) Inventors: Vickie Theofanous; Paul Tikkanen, both of 410 Palmerston Blvd., Toronto, Ontario (CA), M6G 2N8

(*) Notice: Under 35 U.S.C. 154(b), the term of this patent shall be extended for 0 days.

(21) Appl. No.: 09/249,228

(22) Filed: Feb. 11, 1999

(51) Int. Cl.$^7$ .................................................. B62J 21/00
(52) U.S. Cl. .......................... 340/432; 340/427; 340/539; 70/233; 70/434; 70/439
(58) Field of Search .................................. 340/432, 539, 340/427; 70/233, 434, 439

(56) References Cited

U.S. PATENT DOCUMENTS

| 5,270,681 | * | 12/1993 | Jack | 340/427 |
| 5,408,212 | * | 4/1995 | Meyers et al. | 340/427 |
| 5,534,847 | * | 7/1996 | McGregor | 340/432 |
| 5,955,965 | * | 9/1999 | Calandruccio | 340/825.49 |

\* cited by examiner

*Primary Examiner*—Julie Lieu
(74) *Attorney, Agent, or Firm*—Ken J. Pedersen; Barbara S. Pedersen

(57) ABSTRACT

Embodiments of an alarm system are described, which may be mounted or built-in to a bicycle or other device which is in need of anti-theft protection. A loud alarm is connected to or mounted in the protected device, and is operatively connected to either or both: a lock that anchors the device to a stationary object, and/or parts of the protected device that might be stolen or vandalized. The alarm unit is built and wired in such a way that the lock or parts of the protected device may not be significantly tampered with or removed without triggering the alarm. For example, the alarm system is adapted to sound if a bicycle lock is tampered with or if sensors transmit that a bicycle part is being moved or tampered with. Externally-mounted alarm units preferably include a weather-proof casing, which contains a unique clamping feature that makes the alarm tamper-resistant or tamper-proof. The alarm casing may contain a sound chamber that preferably amplifies the alarm sound, waterproofs the alarm component, and prevents a thief from muffling the sound. In internally-mounted embodiments, the alarm may be mounted inside the bicycle frame with sensors mounted preferably on the outside of the various bicycle parts that are frequently stolen with signal wires traveling through the internal channels of the bicycle frame. The alarm unit connection to a U-shaped bicycle lock includes a cable which can only be removed when the alarm is disabled and which has a multiple wire system for presenting a challenge to those attempting to cut the connection between the alarm and lock. Preferably, the alarm casing may only be opened by a special key, and momentary switches in the alarm unit trigger the alarm is anyone tries to remove the alarm unit by abusive methods such as by prying or hammering. Other features may include a transmitter that signals an owner's receiver when the alarm is triggered, and/or a dual-use of the system as both alarm and signaling horn.

10 Claims, 6 Drawing Sheets

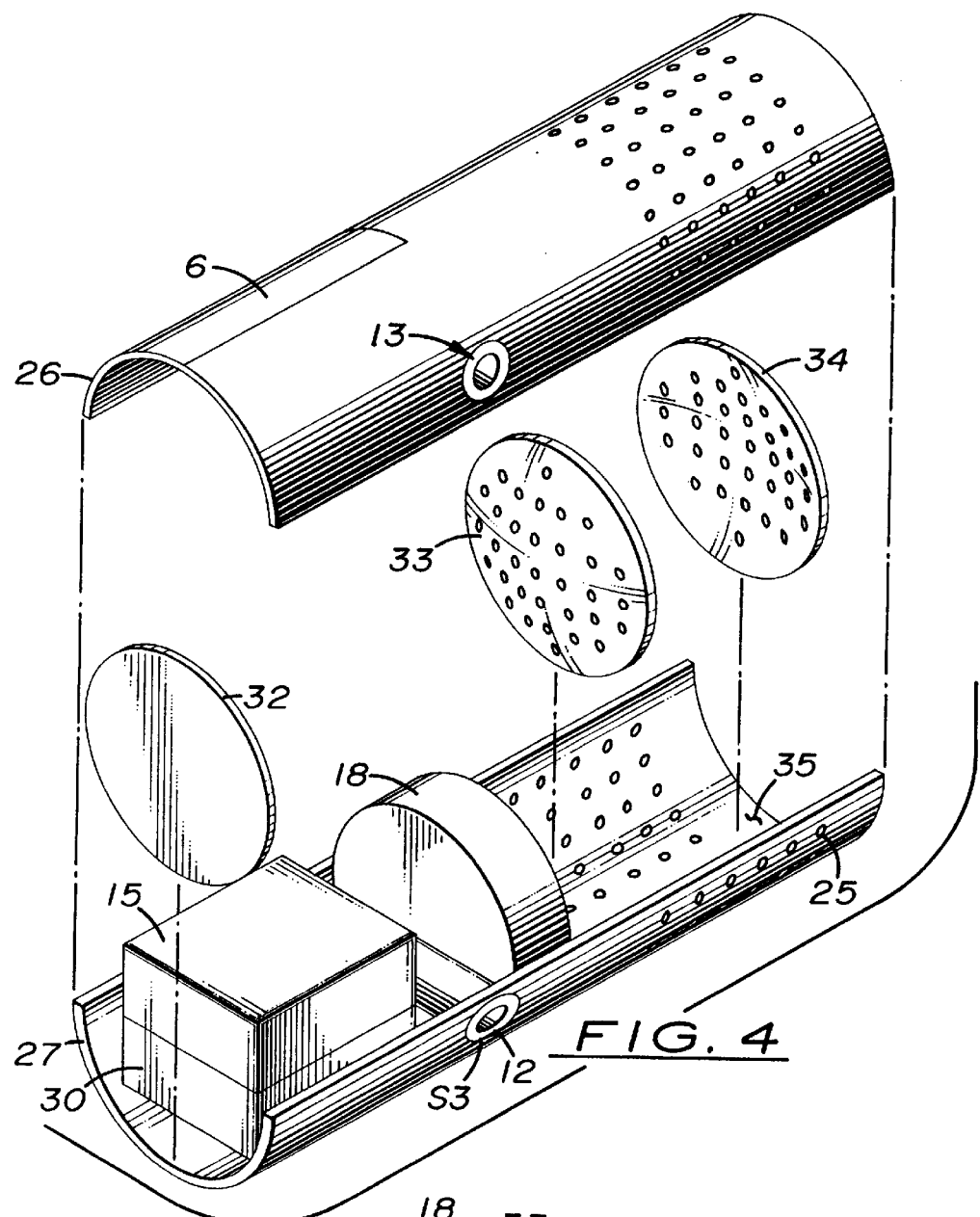
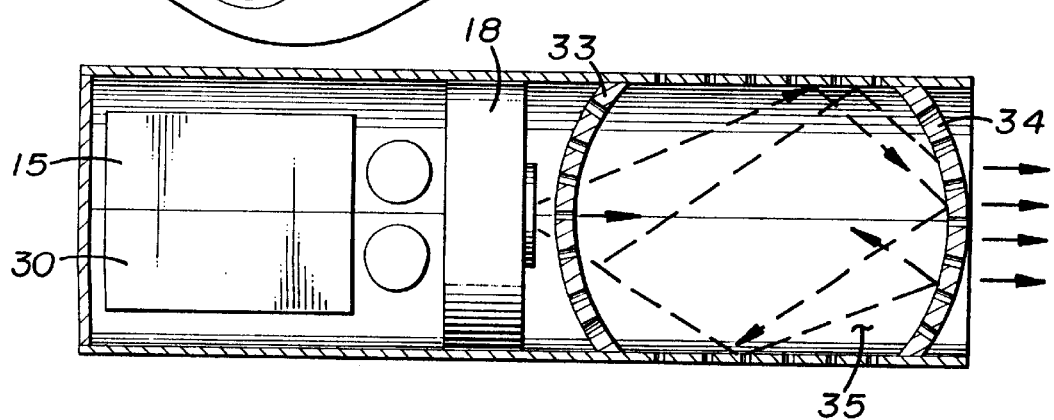

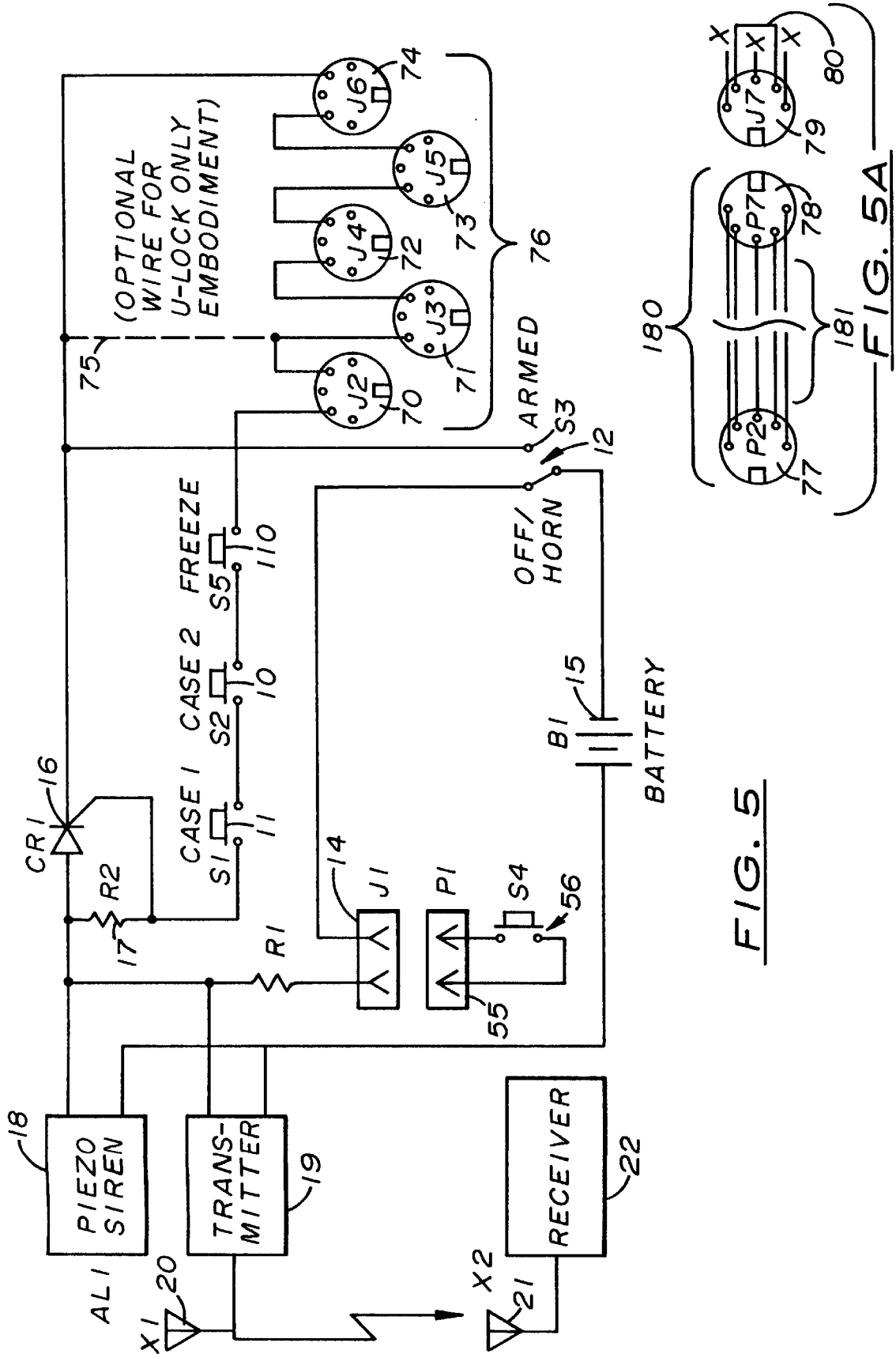

BICYCLE THEFT PROTECTION SYSTEM

BACKGROUND OF THE INVENTION

1. Field of the Invention

Embodiments of the present invention relate to anti-theft devices for bicycles.

2. Related Art

As an introduction to the problems solved by the present invention, one may consider the fact that the bicycle anti-theft devices that are currently available, conventional cable lock and U-lock type devices, can be broken by using either bolt-cutters or metal cutting saws. Thieves have become proficient at rapidly removing these types of locks, making them less than fully secure. Crime statistics of rampant and widespread bicycle theft in the United States confirm that bicycle thefts typically are carried out by cutting of a conventional bicycle lock.

In view of the problem described above, the need exists for a better means of securing bicycles and deterring thieves.

SUMMARY OF THE INVENTION

Accordingly in the present invention, a loud alarm is connected to or mounted in a bicycle frame and is operatively connected to a bicycle lock and/or to parts of the bicycle, in such a way that the lock or bicycle parts may not be significantly tampered with or removed without triggering the alarm. The alarm system is adapted to sound if the lock is tampered with or if sensors transmit a signal that a bicycle part is being tampered with. In one group of externally-mounted embodiments, both the alarm unit and sensors and cables are mounted on the outside of the bicycle. In these externally-mounted units, the alarm includes a weather-proof casing, which contains a unique clamping feature that makes the alarm tamper-resistant or tamper-proof. The alarm casing may contain a sound chamber that preferably amplifies the alarm sound, waterproofs the alarm component, and prevents a thief from muffling the sound. In another group of internally-mounted embodiments, the alarm is mounted inside the bicycle frame and sensors are mounted on the various bicycle parts that are frequently stolen, preferably with the sensors and wiring on the external surfaces of the bicycle, or, less-preferably, with the sensors and wiring in the internal channels of the bicycle frame and components.

According to one aspect of the invention, the alarm unit is preferably connected to a U-shaped lock on the bicycle, by means of a cable comprising multiple wires in parallel conductors. The cable has a connector at each end, which connect the alarm to the lock but which can only be removed when the alarm is disabled. If the cable is disconnected when the alarm is enabled, the alarm will be triggered. Also, a novel means of connection of the multiple wires in the cable prevents theft by presenting a challenge to those attempting to cut the connection between the alarm and lock.

According to another aspect of the invention, the alarm casing may only be opened by a special key. This key provides access to the alarm battery and mounting means. If alarm unit removal is attempted by abusive means, such as by prying or hammering, internal momentary switches will trigger the alarm.

In embodiments in which the built-in alarm unit is fitted internally in the frame tube of the bicycle, sensors are preferably mounted on the handle bar stem, the seat post, and on each wheel hub that prevent those vehicle parts from being removed without triggering the alarm.

In yet other embodiments of the invention, an optional transmitter, mounted inside of the alarm unit will send a signal to the bicycle owner's alarm receiver whenever the alarm is triggered.

According to another aspect of the present invention, the alarm device preferably acts also as a horn. The horn feature is enabled whenever the alarm is disabled, and vice versa, resulting in the invention having dual uses for added convenience and economy.

These and other embodiments, aspects, advantages and features of the present invention will be set forth in part in the description which follows, and in part will become apparent to those skilled in the art by reference to the following description of the invention and referenced drawings, or by practice of the invention. The aspects, advantages and features of the invention are also realized and attained by means of the instrumentalities, procedures, and combinations particularly pointed out in the appended claims.

BRIEF DESCRIPTION OF THE DRAWINGS

FIG. 4 is an exploded view of the alarm unit chassis of FIG. 1, adapted for use with the U-lock assembly of FIG. 3.

FIG. 4a is a side view of the alarm unit of FIG. 4, showing the perforated discs and piezo-siren installed in the alarm unit case, and schematically showing the sound travel between the discs and out of the alarm unit right end.

FIG. 5 is a schematic diagram of one embodiment of the alarm circuit of the present invention.

FIG. 5a is a schematic diagram of one external cable and sensor.

DESCRIPTION OF THE PREFERRED EMBODIMENTS

Referring to the Figures, there are shown several, but not the only, embodiments of the invented alarm system for bicycles. The alarm system 100 may be of two general mounting types: 1) an externally-mounted type, in which the alarm unit and associated sensors and wiring are substantially on the outside of the bicycle and in which the alarm unit is encased for weather protection, or 2) an internally-mounted type, in which the alarm unit is mounted inside the bicycle frame and, preferably but not necessarily, the sensors and wiring are mounted on the outside of the bicycle frame. In each of these types, the wiring may be strapped onto the frame, wrapped, or otherwise secured.

Alternatively, a third type of alarm system is envisioned, that is, an embodiment in which all of the system is substantially internal, that is, alarm unit, sensors and wiring are enclosed inside the bicycle frame. Such embodiments are expected to result in difficulties in properly installing the wiring to extend into the various parts of the bicycle, and so such embodiments are less preferred.

Figure 1:
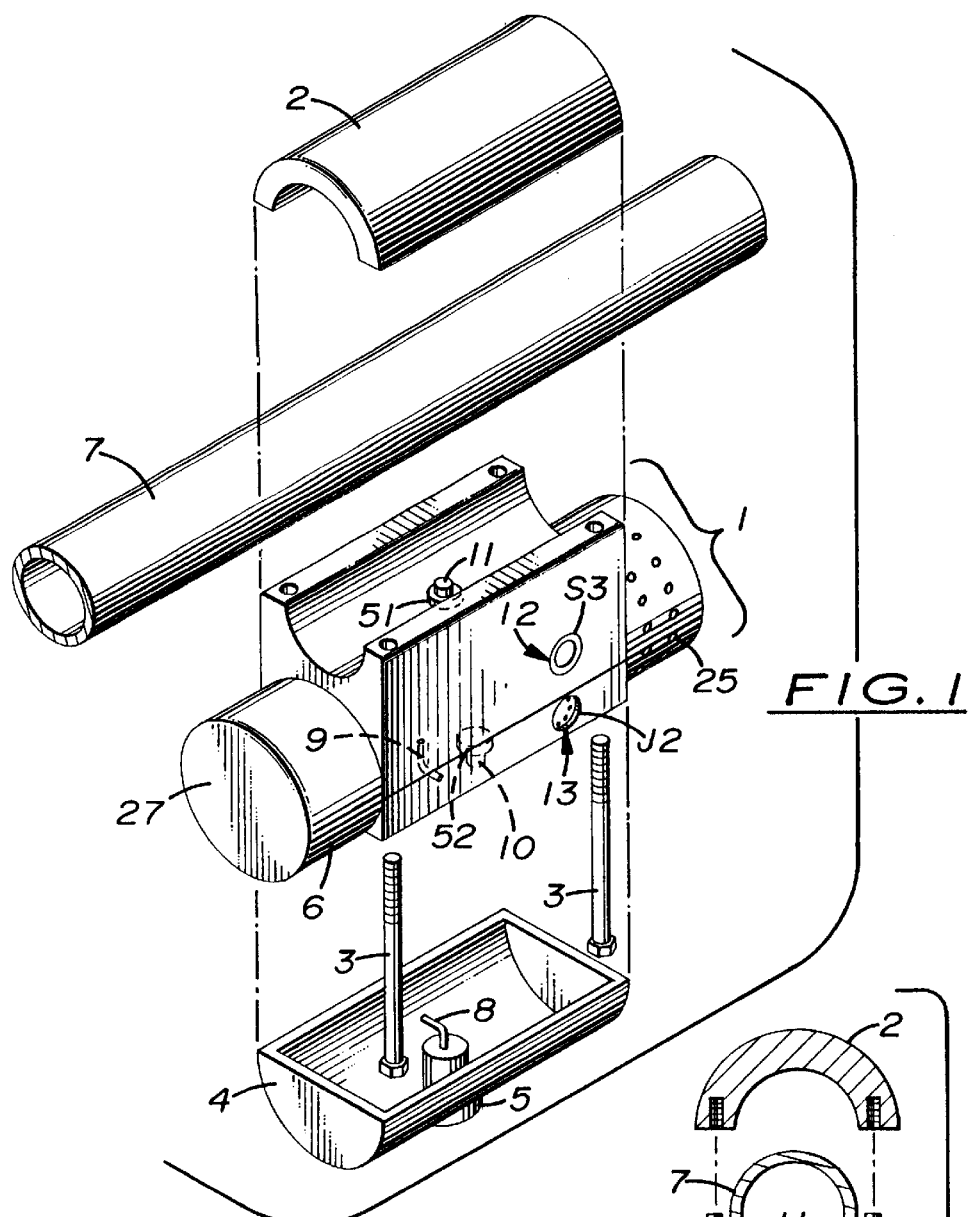
FIG. 1 is a side view of one embodiment of the invented alarm chassis assembly and related components.
Figure 1A:
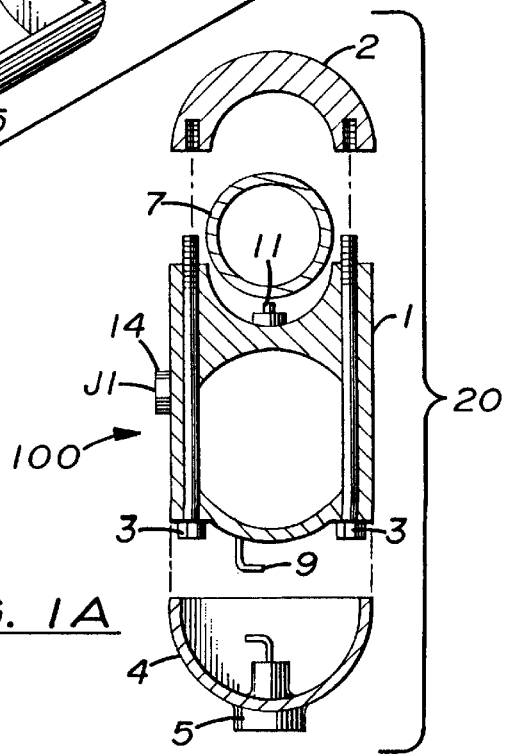
FIG. 1a is a front view of the alarm chassis assembly and related components of the embodiment of FIG. 1.

FIG. 1 is a side view and FIG. 1a is a front view of the preferred alarm chassis assembly and related components of the externally-mounted embodiment. The main chassis 1, which houses the main circuitry and alarm siren is constructed of two case halves 26, 27 which are die-cast or machined from a suitable metal or plastic material. One-piece clamp 2 and 4 clamp bolts 3 secure the main chassis to bicycle frame 7 by means of the four bolts 3 extending into four threaded holes in the clamp 2. Cover 4 is secured to the main chassis by turning cam lock 5, engaging latch 8 to closure 9. The cover serves as a battery and clamp bolt protector/access and transmitter holder, to allow the owner of the bicycle access to the battery compartment 6 and clamp bolts 3, while also preventing inadvertent entry by would-be thieves. Keyswitch 12, which serves to "arm" the alarm, is operated by the same key as cam lock 5. In another embodiment, the keyswitch and cam lock may be one and the same component.

Two momentary switches 10, 11 are mounted on the top and bottom of the main chassis 1. When cover 4 and clamp 2 are installed, the two normally open switches are set to their closed position by pressing against frame 7 and cover 4. If the keyswitch 12 is set to the armed position and the lock assembly is forced open, for example, by cutting or prying, then the alarm will trigger.

Figure 2:
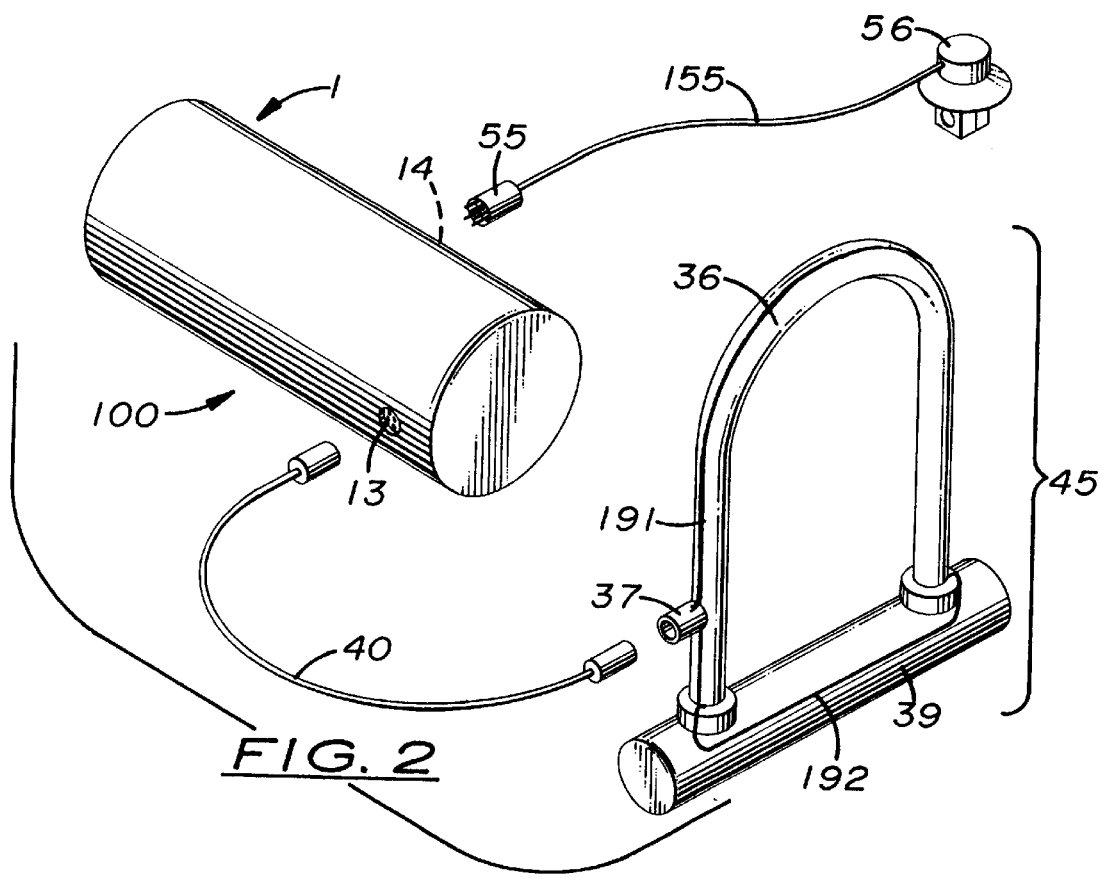
FIG. 2 is an assembly drawing of the alarm unit and external components of an externally-mounted embodiment of the invention.

FIG. 2 is an assembly drawing of the alarm unit and external components of the externally-mounted embodiment. Horn button 56 connects through cable 155 and connector 55 to jack 14. U-lock assembly 45 connects to 5-pin female jack 13 through 5-pin male cable 40. Attached onto the outer surface of lock bar 36 and bolt 39 of U-lock assembly 45 is a lock wiring assembly comprising multiple-conductor wire 191 and 192 that close a circuit when the lock bar 36 and bolt 39 are locked together, as shown in FIG. 2.

Figure 3:
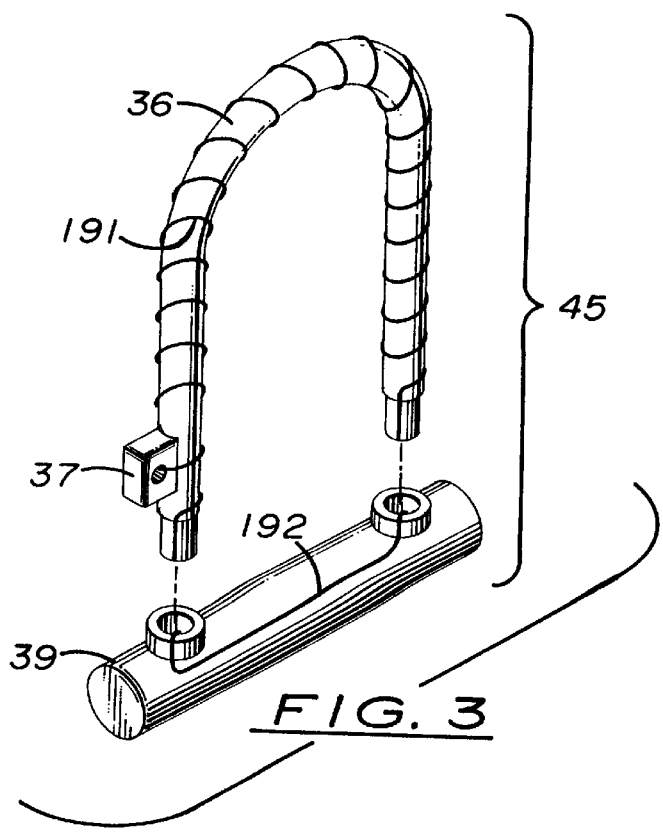
FIG. 3 is a side view of one embodiment of a U-lock assembly adapted for use with the invented alarm system.

FIG. 3 is a detail perspective view of one embodiment of a U-lock assembly 45 of the present invention. The lock bar 36 and bolt 39 are specially wired to close the circuit when the lock is closed, which circuit connects to connector 37, and, hence, to the alarm unit. Preferably, multiple conductor wires are attached to (FIG. 2) or wound around (FIG. 3) the U-lock assembly 45.

FIG. 4 shows case halves 26, 27 separated to reveal battery 15, circuit 30 and piezoelectric siren 18. Sound chamber 35 is formed by the sandwiching of two perforated discs 33, 34 between case halves 26 and 27 containing sound holes 25. As best illustrated in FIG. 4a, perforated disc 33 is preferably concave when viewed from the right end of the case in FIG. 4a, and disc 34 is preferably convex when viewed from the right end of the case in FIG. 4a. The concave and convex shapes serve to provide curved, perforated walls around the sound chamber, which enhance sound travel, as illustrated by the dashed sound travel arrows bouncing between the concave and convex discs in FIG. 4a. A feature of this invention is that the alarm cannot easily be muffled, due to the multiplicity of holes surrounding the sound chamber 35. Case halves 26, 27 are welded by suitable means along their outer seams and also to solid disc 32 and perforated discs 33, 34.

FIG. 5 is a schematic diagram of the alarm circuit of the present invention. The circuit will activate piezoelectric siren 18 and transmitter 19 whenever the silicon-controlled rectifier (SCR) is triggered. Triggering occurs in the Off/Horn mode only when the momentary horn switch 56 is closed. In the armed mode, the SCR will trigger when either switch 10 or 11 is open or when temperature switch 110 is open, or when an open circuit occurs at any device connected to connectors 70, 71, 72, 73, and 74. The purpose of temperature switch 110 is to trigger an alarm if a would-be thief sprays the alarm system with freeze spray, in an attempt to immobilize the alarm or crack the case 1 by making the metal brittle.

In a simpler embodiment, having no wheel, seat-post or handle-bar sensors, but only a u-lock sensor, jumper wire 75 can be installed, and connector group 76 can be eliminated from the circuit. Connector 14 (J1) connects to horn switch plug 55 (P1). If optional transmitter 19 is enabled and the alarm is triggered, the transmitter 19 will send a signal via antenna 20 to the alarm owner's receiver 22 via receiver antenna 21. The entire circuit is powered by battery 15.

FIG. 5a is a schematic diagram of one external cable and sensor. Front-wheel sensor 50, rear-wheel sensor 51, handle-bar sensor 52, and seat-post sensor 53 are essentially wired in series with the U-lock assembly through connectors 70, 71, 72, 73, and 74, such that if any switch is opened the alarm will trigger. In this embodiment, the cable 180 wiring shown in FIG. 5a is constructed using 5-conductor cable 181. This schematic is typical for any of the 5 sensor cable assemblies of the built-in embodiment. Actually, only two wires, called the "operative wires," are required to complete the circuit and the other three are "dummy wires". This is intended to prevent someone from easily shorting the wires in between the alarm and the external sensors. By using 5 wires, it is difficult to guess which two wires are the ones to short-out. Cutting the wires one at a time to find the 2 live wires would take too long and almost certainly trigger the alarm. Connector plug P2 (77) connects to connector jack J2 (70). The sensor circuit is completed by the connection of plug P7 (78) to jack J7 (79), which features jumper 80, internally connected to close the loop.

Figure 6:
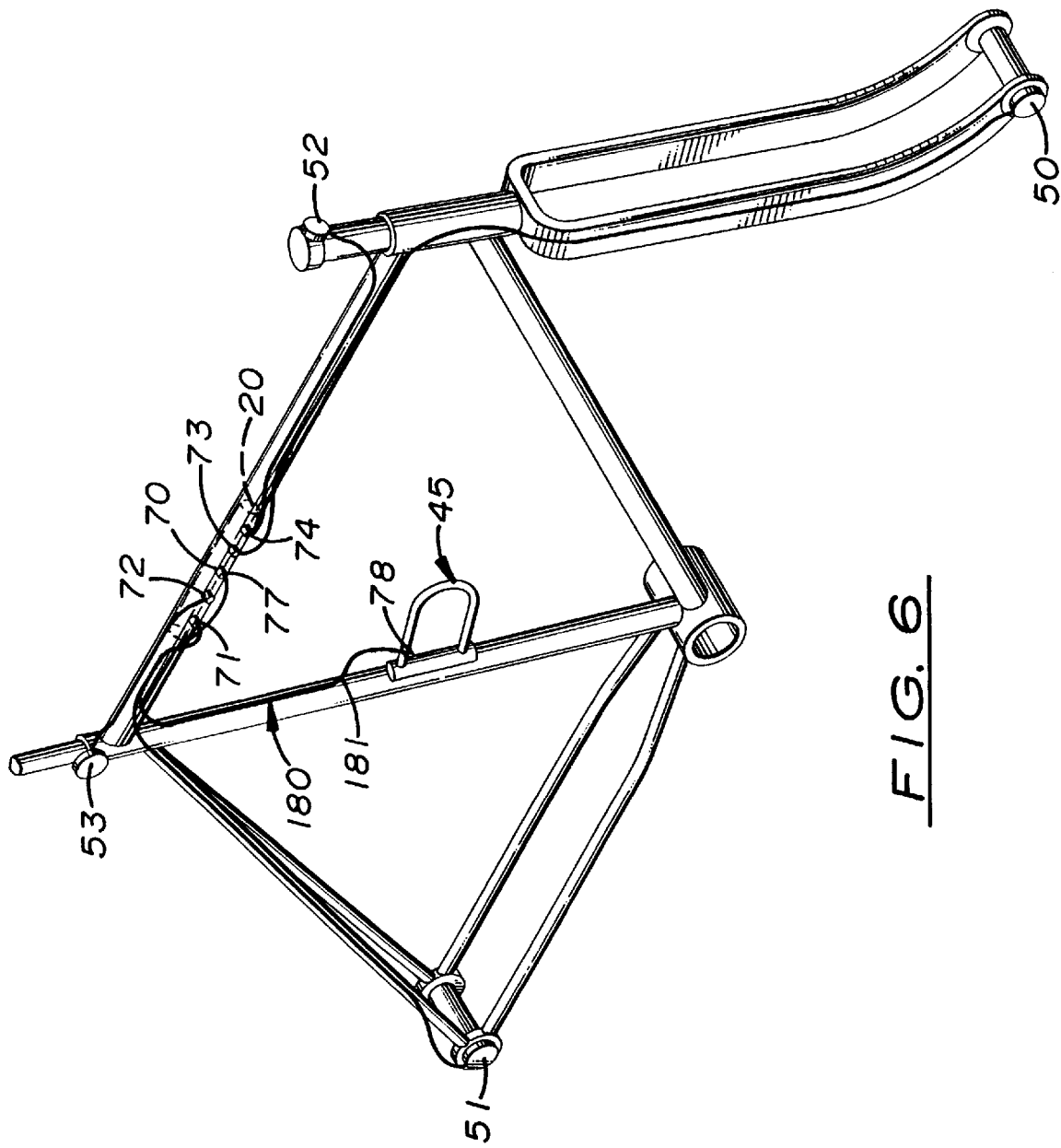
FIG. 6 is a front perspective view of a bicycle with one embodiment of the present built-in alarm invention, an internally-mounted alarm unit with external cables and sensors.

FIG. 6 is a plan view of the built-in, "internal" alarm embodiment, in which the alarm unit 20 is inside the top tube of the bicycle frame, and the connectors 70, 71, 72, 73, and 74 extend from the alarm unit 20 to pass through the frame wall, to curve along or wind around the frame external surface, and to reach to the external sensors 50, 51, 52, 53. FIG. 6 shows preferred location of sensors 50, 51, 52, 53, U-lock 45, alarm unit assembly 20, and connectors 70, 71, 72, 73, and 74. U-lock cable 180, with its component connectors 77, 78 and wire 181, are also shown.

Figure 7:
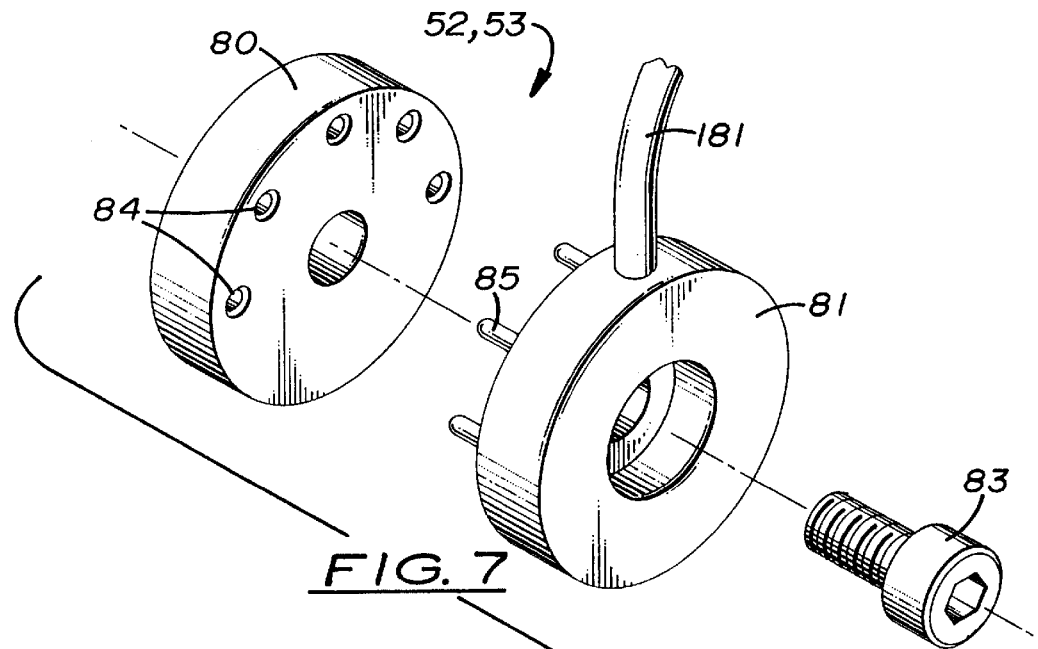
FIG. 7 is an exploded view of a seat-post and handle-bar type of sensor assembly.

FIG. 7 is an exploded view of a seat-post and handle-bar type of sensor assembly. Jack 80 is fixed to the seat-post. When bolt 83 is tightened, to lock down the handle-bar stem or seat-post, then the pins 85 of plug 81 align with the sockets 84 of jack 80 and a connection is made through cable 181 back to the alarm circuit.

Figure 8:
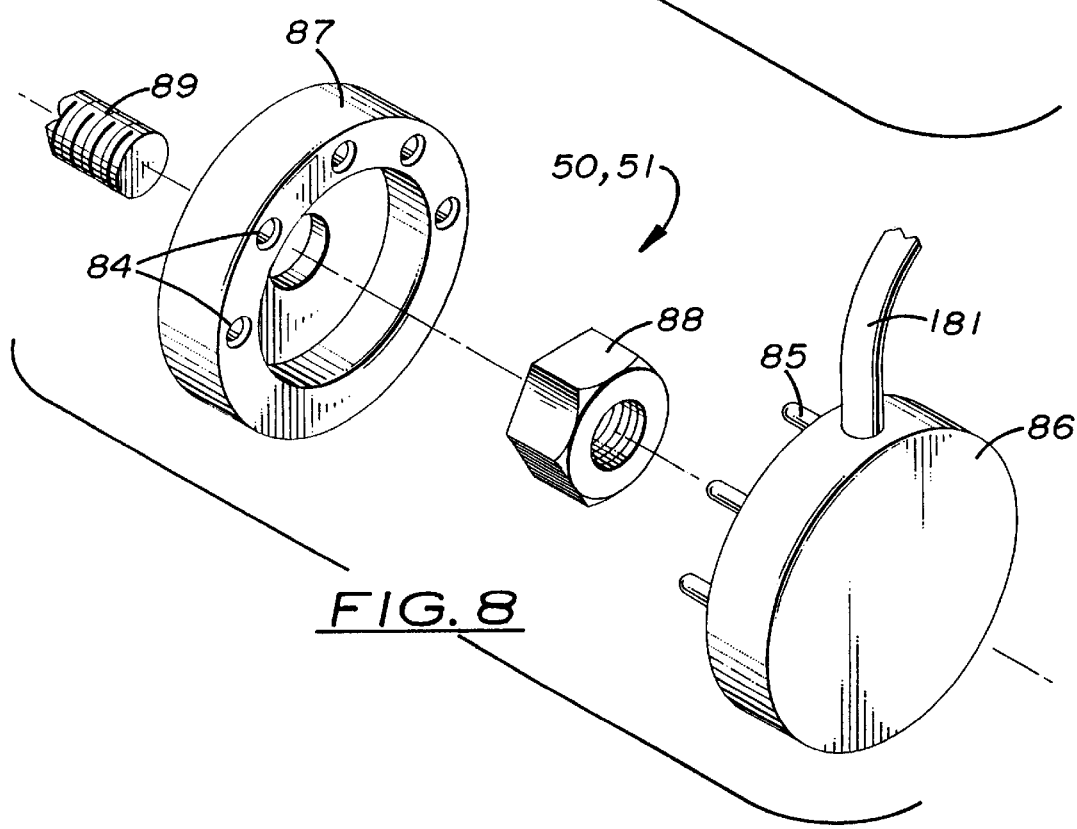
FIG. 8 is an exploded view of a wheel-nut sensor assembly.

FIG. 8 is an exploded view of a wheel-nut sensor assembly. In a similar fashion to jack 80 being fixed to a seat-post, jack 87 is fixed to the wheel axle. When nut 88 is tightened, to lock down the wheel, then the pins 85 of pug 86 align with the sockets 84 of jack 87 and a connection is made through cable 181 back to the alarm circuit.

While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure and practice of the invention to one of ordinary skill in the art to which the invention applies.

I claim:

1. A bicycle alarm system for use with a bicycle and a bicycle lock adapted to anchor the bicycle to a stationary object, the alarm system comprising:

an alarm unit that connects to a bicycle and comprises an audible alarm;

a lock wiring assembly that attaches onto a bicycle lock, the lock wiring assembly including multiple-conductor wiring on an outer surface of the lock comprising a plurality of conductor wires, wherein some of the conductor wires are operative wires adapted to complete a circuit when the lock is closed and are adapted to open the circuit when the lock is opened, and wherein some of the conductor wires are dummy wires that are not in the circuit;

wherein the circuit completed by the operative wires is electrically connected to the alarm unit, so that breaking the circuit by opening the lock triggers the audible alarm and so that breaking the circuit by cutting any of the operative wires triggers the audible alarm;

wherein the dummy wires make it difficult for a thief to select the operative wires from the plurality of conductor wires to short-circuit the operative wires in an attempt to prevent breaking of the circuit and sounding of the audible alarm while the thief opens or cuts the lock.

2. A bicycle alarm system as in claim 1, wherein the multiple-conductor wiring comprises five conductor wires, and wherein two of the conductor wires are operative wires and three of the conductor wires are dummy wires.

3. A bicycle alarm system as in claim 1, further comprising:

a multiple-conductor cable between the lock wiring assembly and the alarm unit, the cable having a plurality of conductor wires, wherein some of the conductor wires are operative wires adapted to complete a circuit between the lock wiring assembly and the alarm unit, and wherein some of the conductor wires are dummy wires that are not in said circuit between the lock wiring assembly and the alarm unit;

wherein breaking said circuit between the lock wiring assembly and the alarm unit by cutting any of the operative wires of the cable will trigger the audible alarm; and wherein it is difficult for a thief to select the operative wires of the cable from the plurality of conductor wires of the cable to short-circuit said operative wires, to prevent breaking of the circuit between the lock wiring assembly and the alarm unit and to prevent sounding of the audible alarm while the thief opens or cuts the lock.

4. The bicycle alarm system as in claim 3, wherein the cable comprises five conductive wires, two of which are operative wires and three of which are dummy wires, and the cable comprises a jack having five sockets for cooperating with a plug with five pins.

5. The bicycle alarm system as in claim 3, wherein the cable comprises five conductive wires, two of which are operative wires and three of which are dummy wires, the cable comprises a plug with five pins for cooperating with a jack with five sockets.

6. The bicycle alarm system as in claim 1, wherein:

the alarm unit is elongated and has two ends and a central region; and the audible alarm is adapted to enhance sound travel by including a siren located in the central region, and a sound chamber between the siren and an end of the alarm unit, the sound chamber having perforated, spaced convex and concave discs; and sound from the siren bounces between the discs prior to exiting the sound chamber.

7. The bicycle alarm system as in claim 1, further comprising a key switch moveable to first alarm-armed position, and to a second alarm-off, horn-only position, and further comprising a momentary horn switch triggers the audible alarm as a horn while the momentary horn switch is depressed by a user and when the key switch is in the alarmoff, horn-only position.

8. The bicycle alarm system as in claim 1, wherein the alarm unit further comprises a transmitter and an antenna, wherein the transmitter is adapted to send a signal via the antenna to an owner's receiver when the audible alarm is triggered to sound.

9. The bicycle alarm system as in claim 1, further comprising:

a clamping system for connecting the alarm unit to the bicycle, wherein the clamping system has a clamp for extending around a portion of a bicycle frame, a plurality of clamp bolts with heads and with opposing ends extending through the alarm unit and connecting to the clamp, and a cover covering the clamp bolt heads to prevent removal of the clamp bolts from the clamp; and a plurality of momentary switches, wherein:

one of said momentary switches is pressed between the alarm unit and a portion of the bicycle frame, when the alarm unit is clamped to the bicycle frame, and is adapted so that distancing the alarm unit from the bicycle frame releases the momentary switch and triggers the audible alarm; and one of said momentary switches is pressed between the alarm unit and the cover and adapted so that distancing the cover from the alarm unit releases the momentary switch and triggers the audible alarm;

whereby a thief's prying at the cover, clamp, or alarm unit to remove the alarm unit from the bicycle will cause triggering of the audible alarm by release of one or both of the momentary switches.

10. The bicycle alarm system as in claim 1, for use with a U-shaped lock having a U-shaped bracket and a locking bar, and the multiple-conductor wiring extends all the way around the lock on lock outer surface of the U-shaped bracket and along the locking bar.

* * * * *